United States Patent [19]

Peterson et al.

[11] Patent Number: 5,079,998
[45] Date of Patent: Jan. 14, 1992

[54] PNEUMATIC DRIVER

[75] Inventors: Robert S. Peterson; M. Thomas McGuire; Theodore E. Raymond, all of Columbia, S.C.

[73] Assignee: Westinghouse Electric Corp., Pittsburgh, Pa.

[21] Appl. No.: 649,625

[22] Filed: Feb. 1, 1991

[51] Int. Cl.$^5$ .............................................. F01B 19/00
[52] U.S. Cl. ...................................... 92/48; 92/61; 92/62; 92/66; 92/117 R; 92/92; 92/151; 92/161
[58] Field of Search ............. 92/48, 62, 61, 66, 117 R, 92/92, 91, 150, 151, 161; 91/172, 176, 181, 520, 533

[56] References Cited

U.S. PATENT DOCUMENTS

| | | |
|---|---|---|
| 1,995,659 | 3/1935 | Trier . |
| 2,467,883 | 4/1949 | Edwards, Jr. ...................... 92/48 |
| 2,546,596 | 3/1951 | Haines, Sr. ........................ 92/48 |
| 2,740,382 | 4/1956 | Morgan ............................ 92/161 |
| 2,976,085 | 3/1961 | Grogan . |
| 3,192,865 | 7/1965 | Klempay ........................... 91/273 |
| 3,371,583 | 3/1968 | Blatt ............................... 92/161 |
| 3,613,514 | 4/1969 | Melchior ........................... 92/48 |
| 3,643,496 | 2/1972 | Zajfc . |
| 3,975,989 | 8/1976 | Hirmann . |
| 4,759,260 | 7/1988 | Lew ................................ 91/533 |
| 4,811,652 | 3/1989 | Ells ................................ 92/48 |

FOREIGN PATENT DOCUMENTS 2047344 11/1980 United Kingdom .................... 92/48

Primary Examiner—Edward K. Look
Assistant Examiner—Thomas Denion

[57] ABSTRACT

A pneumatic driver is disclosed. The pneumatic driver includes a frame and a shaft movable between an extended driving position and a retracted position relative to the frame. A first inflatable air bladder is supported by the frame. The first inflatable air bladder is operatively connected to the shaft so that when the first air bladder is inflated, the shaft is moved into an extended driving position. A second inflatable air bladder is supported by the frame and operatively connected to the shaft. When the second air bladder is inflated, the shaft is moved to a retracted position. A valve manifold operatively connects first and second air bladders for controlling inflation and deflation of the air bladders. The frame includes longitudinal guide rods and transverse frame members fixed to the guide rods. A shaft support member having the shaft mounted thereto is slidably mounted on the guiderods. Support rods are mounted to the shaft support member by bolts received in orifices to provide a clearance fit.

12 Claims, 1 Drawing Sheet

PNEUMATIC DRIVER

FIELD OF THE INVENTION

This invention relates to a pneumatic driver, and more particularly, this invention relates to a pneumatic driver having air bladder expansion means for engaging and moving a shaft between an extended driving position and a retracted position for operating a positive displacement pump and the like.

BACKGROUND OF THE INVENTION

In the manufacture of nuclear fuel material, an intermediate product, ammonium diurinate (ADU) is formed during the conversion of uranium hexafloride to uranium dioxide. During this conversion process, the ammonium diurinate is dewatered in a centrifuge. After dewatering, the ammonium diurinate is partially rewetted and then held in a stirred surge tank as a slurry. Afterwards, the ammonium diurinate slurry is transported by a positive displacement pump to a dryer for solidification.

In the manufacturing process, a positive displacement pump having a shaft driven by a pneumatic driver is used. In one prior art type of pneumatic driver, air is injected alternately on two sides of a piston in a single cylinder. The piston axially strokes the pump shaft creating the positive displacement in the pump necessary for pumping the slurry. A pneumatic driver has been found desirable because of its simplicity and resistance to corrosion and abrasion. The manufacturing of nuclear fuel occurs in a corrosive and abrasive environment. Uranium is very corrosive and abrasive and small dust particles gather on moving parts and the uranium dust particles tend to wear the mechanical parts quickly. Additionally, nitric acid commonly is used in the manufacturing process and tends to wear the seals and bearings. As a result, it has been found desirable to use means such as a pneumatic driver which is simple in construction and efficient for driving a positive displacement pump when pumping an ammonium diurinate slurry.

During manufacturing of the nuclear fuel material, it has been found that the bearings of the positive displacement pump shaft wear from the continual work of pumping the corrosive and abrasive ammonium diurinate slurry. When the pump bearings wear, the pump shaft is subjected to greater radial movement. As a result of the increased radial movement of the pump shaft, the seals surrounding the pump shaft sometimes wear allowing some leakage of the ammonium diurinate onto the pump shaft. Any nominal amount of ammonium diurinate leaking on to the pump shaft typically may not be a problem. However, if air is blown onto the shaft, such as resulting from air leaking from the pneumatic driver which actuates the pump, the ammonium diurinate is blown into the atmosphere and mixes with the air to become a health hazard to workers. Often, the greater radial movement of the pump shaft wears the bearings of the pneumatic driver shaft and causes an increased radial movement of the driver shaft. This results in failure of the atmosphere seal in the pneumatic driver and as a result, air leaks past the atmosphere seal. This leaking air typically is blown onto the pump shaft and then blows the radioactive ammonium diurinate positioned on the shaft. As a result, a health hazard ensues. It is therefore more desirable to provide a pneumatic driver which does not use a piston for driving a shaft but makes use of an expandable air bladder and the like from which air may not leak such as around a piston and where the air bladder is expandable for moving a driving shaft forward.

It is therefore an object of this invention to provide a pneumatic driver which overcomes the deficiencies of the prior art.

It is another object of this invention to provide a pneumatic driver which uses air bladder expansion means for engaging and moving a shaft between an extended driving position and a retracted position for operating a positive displacement pump and the like.

It is another object of this invention to provide a pneumatic driver which is constructed to provide some freedom of lateral movement to the driver shaft without adversely affecting performance of the driver or allowing leakage of air.

SUMMARY OF THE INVENTION

These and other objects and advantages of the present invention are accomplished by the pneumatic driver in accordance with the present invention which includes a frame having two longitudinally extending guiderods. Front and rear spaced transverse frame members are fixed to the guiderods. The front frame member has a shaft receiving orifice extending therethrough.

A shaft support member is positioned between front and rear frame members and is slidably mounted on the guiderods. A shaft is mounted on the shaft support member and extends forwardly through the shaft receiving orifice of the front frame member. The shaft receiving orifice is dimensioned larger than the shaft by at least about 0.005 inches to provide a clearance fit and allow radial movement of the shaft within the shaft receiving orifice.

Two spaced rods are mounted on the shaft support member and slidably mounted onto the rear frame member. A rear support member is mounted to the ends of the support rods. The shaft support member includes a pair of openings. A bolt extends through each opening into the support rod. The bolts and openings are dimensioned to obtain clearance between each bolt and the openings of the shaft support member for allowing some movement of the shaft support member relative to the bolt. The clearance allows the shaft to move slightly without adversely affecting the pneumatic driver operation. This is important if a positive displacement pump shaft or other shaft of an actuated unit has some radial or side movement causing movement in the shaft.

A first inflatable air bladder is mounted between the rear frame plate and the shaft support member and engages the shaft support member for moving the shaft support member and shaft in an extended position when the first air bladder is inflated. The second inflatable air bladder is mounted between the rear frame member and the rear support member and engages the rear support member for moving the rear support member, support rods and shaft rearward when the second air bladder is inflated. Valve manifold means operatively connects the first and second air bladders for allowing air into and out of said air bladders and for inflating the first air bladder while deflating the second air bladder and for inflating the second air bladder while deflating the first air bladder.

BRIEF DESCRIPTION OF THE DRAWINGS

Some of the objects and advantages of the present invention having been stated, others will be more fully understood from the detailed description which follows and by reference to the accompanying drawings in which.

DETAILED DESCRIPTION OF THE PREFERRED EMBODIMENT

Figure 1:
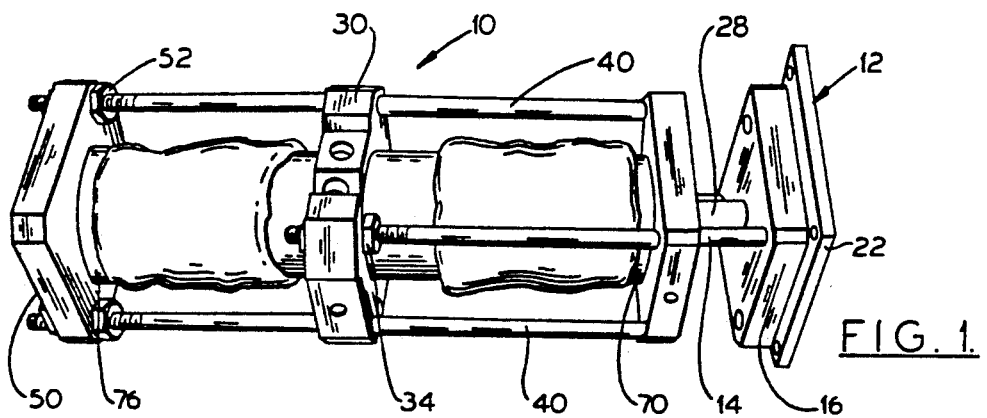
FIG. 1 is an isometric view of the pneumatic driver in accordance with the present invention.

Referring now to the drawings, and more particularly to FIG. 1, there is illustrated a pneumatic driver 10 in accordance with the present invention. Throughout the specification, the pneumatic driver 10 is described in relation to driving and actuating a positive displacement pump used in pumping ammonium diurinate slurry. However, the pneumatic driver can be used for driving pumps and other objects where a linear driving motion of a driver shaft is required.

Figure 2:
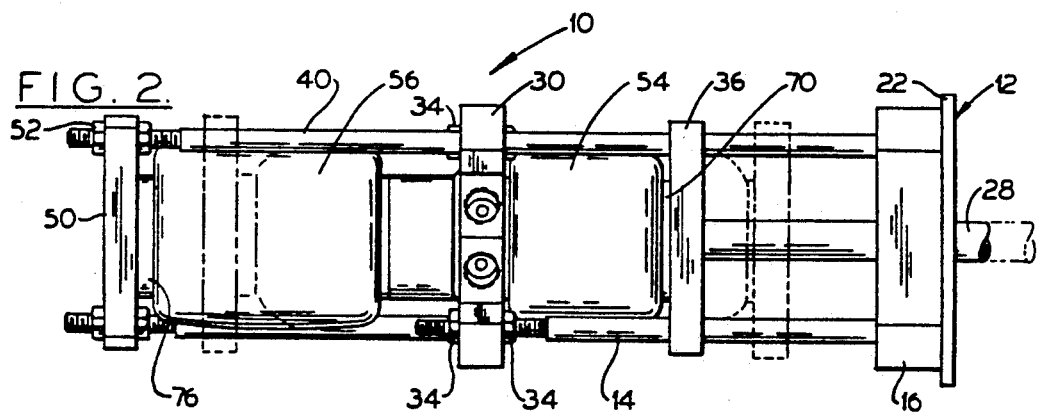
FIG. 2 is a plan view of the pneumatic driver in accordance with the present invention and showing the shaft in a retracted position and showing by broken lines the shaft in an extended driving position.
Figure 3:
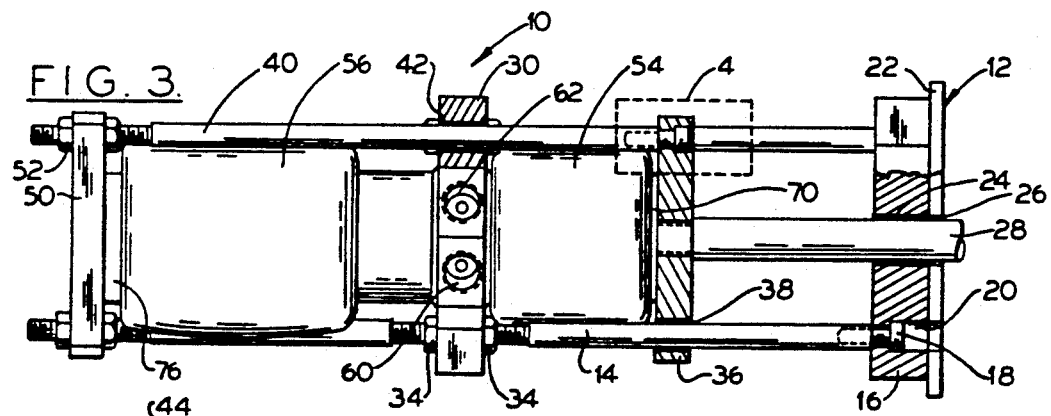
FIG. 3 is a plan view in partial section of the pneumatic driver in accordance with the present invention.

As shown in FIGS. 1 and 2, the pneumatic driver includes a frame which is illustrated broadly at 12. The frame 12 preferably has at least one guiderod and preferably, as illustrated, includes two, substantially parallel longitudinally extending guiderods 14 formed from a strong, light weight material such as aluminum. A rectangularly configured front frame member 16, in the form of a plate, is fixed to the front ends of the guide rods at opposite corners (FIG. 1). Bolts 18 are inserted through counterbored openings 20 in the front frame member and into the guide rods to retain the guiderods to the front frame member (FIG. 3). An integral mounting flange 22 is positioned along the front portion of the front frame member 16 and mounts the pneumatic driver 10 to a mounting member of a positive displacement pump or other means. Preferably, the front frame member 16 is made of a light weight strong material such as aluminum.

A shaft receiving orifice 24 extends in through the front frame member 16 and includes a bushing 26 fixed therein. The bushing 26 is dimensioned to receive the driving shaft 28 of the pneumatic driver. Preferably the bushing 26 is dimensioned larger than the shaft by at least about 0.005 inches to provide a clearance fit and allow movement of the driving shaft 28 within the shaft receiving orifice 24 and bushing 26. The clearance fit between the shaft 28 and bushing 24 allows sufficient tolerance during operation of the pneumatic driver to allow some radial and side movement of the shaft in the orifice which is needed when the shaft bearings of a positive displacement pump are worn. When a positive displacement pump shaft causes radial and side movement of the pneumatic driver shaft, the chance of damage to the pneumatic driver is prevented. The rear portions of the guiderods are threaded and a substantially rectangularly configured rear frame member 30 is received through mounting holes onto the threaded ends of the guiderods and retained thereto by bolts 34 as indicated in FIGS. 2 and 3.

A shaft support member 36 is positioned between the front and rear frame members 16, and is slidably mounted on the guiderods as illustrated in FIGS. 1 through 3. The shaft support member 36 is a substantially rectangularly configured plate and includes at two opposite corner openings bushing 38 fixed within each orifice which is dimensioned for a sliding fit with a respective guiderod 14. Preferably, at least about 0.005 inches clearance exists between the bushing 38 and guiderods 14 to allow for some radial and side movement of the shaft support member 36 and guiderods 14. The shaft support member 36 includes an orifice in a medial portion thereof in which the driving shaft 28 is threadably mounted thereto (FIG. 3). Preferably, both the shaft and the shaft support member 36 are made of a lightweight, strong material such as aluminum.

Figures 4, 5:
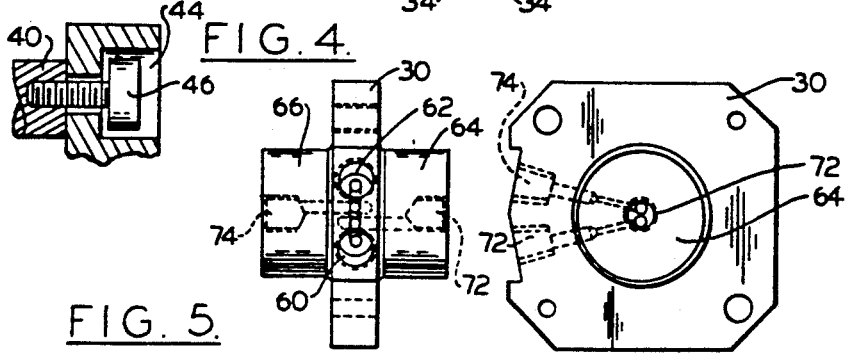
FIG. 4 is an enlarged sectional view of the block marked 4 in FIG. 3.
FIG. 5 is a plan view of the rear frame member and valve manifold in accordance with the present invention.

Two, longitudinally extending and substantially parallel support rods 40 are mounted on the shaft support member 36 and extend rearward therefrom. The support rods 40 are mounted at opposite corners on the shaft support member from where the shaft support member is slidably received on the guiderods. The support rods 40 are slidably mounted into bushings 42 fixed in orifices positioned on the rear frame member at opposite corners from where the guiderods are fixed thereto (FIG. 1). Means mounting the support rods 40 to the shaft support member 36 includes a pair of counterbore orifices 44 in the shaft support member through which a bolt 46 extends through each orifice and into the support rod (FIG. 4). The bolts 46 and counterbore orifices 44 are dimensioned to obtain clearance between each bolt 46 and the shaft support member orifices 44 for allowing some radial and side movement of the shaft support member relative to the bolt. Typically, the clearance is about 0.005 inches to 0.010 inches. This clearance provides some movement of the shaft support member relative to the bolt 46 which is necessary when the shaft bushings and bearings of a positive displacement pump used for pumping a slurry of ammonium diurinate are worn and cause movement of the pump shaft. Thus, the pneumatic driver provides some movement leeway of the shaft support member and shaft to account for the movement of the positive displacement pump shaft. The rear portions of the support rods are threaded. A rectangularly configured rear support member 50 is fixed at its opposite corners onto the threaded ends and retained thereto by means of bolts 52 (FIG. 3).

As illustrated in FIG. 2, the described structure provides for movement of the driving shaft 28 when the front and rear shaft support members 36, 50 and support rods 40 are moved relative to the fixed front and rear frame members 16, 30. The driving shaft 28 movement provides a driving force for operating a positive displacement pump and the like. In accordance with the present invention, pneumatic expansion means in the form of first and second inflatable air bladders, 54 and 56, are provided for moving the shaft back and forth by alternately inflating and deflating the air bladders (FIG. 2).

Figure 6:
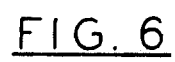
FIG. 6 is a side elevation view of the rear frame member and valve manifold.

As illustrated in FIGS. 4 and 5, the rear frame member 30 includes first and second air passageways 60 and 62 forming a valve manifold. The air passageways 60 and 62 extend downward into the rear frame member 30 from the top to a medial portion thereof (FIG. 6). The first air passageway 60 extends downward into the rear frame member 30 and forwardly through a front, first mounting manifold member 64. The second air passageway 62 extends downward into the rear frame member and rearward through a rear, second manifold member 66. A conventional four-way valve (not shown in detail) can be positioned in the manifold medial portion defined by the rear frame member 30 to aid in withdrawal of air from one air passageway when air is forced into the other air passageway. During operation of the pneumatic driver 10, the valve manifold allows air in and out of the air bladders 54, 56 and controls inflation and deflation of the air bladders for inflating the first air bladder while deflating the second air bladder and inflating the second air bladder while deflating the first air bladder.

As illustrated, the first inflatable air bladder 54 is mounted between the rear frame member 30 and the shaft support member 36. Although a number of different types of air bladders can be used, it has been determined that an air bladder sold by Firestone under the name Airstroke Actuator is acceptable for use in the present invention. These bladders typically have an expansion height of over 4 inches and can exert over 800 pounds of force when 100 pounds per square inch of pressurized air is applied into the air bladder. The front of the first inflatable air bladder 54 is connected to a mounting flange 70 positioned on the shaft support member 36. The rear portion of the first inflatable air bladder 54 includes a threaded stud (not shown in detail) which is threadably received into a counterbored threaded passageway 72 of the front manifold member 64 of the rear frame member 30 (FIG. 5). The air bladder typically includes a recessed portion at the rear portion which is dimensioned to receive therein the front manifold member 64.

The second air bladder 56 is mounted in a similar manner as the first air bladder 54. The second air bladder 56 is mounted to the rear, second manifold member 66. The front portion of the second air bladder 56 includes a threaded stud as in the first air bladder which is inserted into a threaded counterbored passageway 74 of the rear manifold member 66. The rear portion is connected to a mounting flange 76 on the rear support member 50.

Method of Operation

In operation, appropriate high pressure air lines (not shown in detail) are screwed into threaded entrance fittings of first and second air passageways. When air is injected into the first air passageway 60, the first air bladder 54 is inflated forcing the shaft support member 36 and shaft 28 connected thereto into an extended driving position (FIG. 2). When air is injected into the second air passageway 62, the second air bladder is inflated, forcing the rear shaft support member rearward. The support rods 40 are forced rearward together with the shaft support member connected thereto which moves the shaft into a retracted position. The valve manifold allows the air contained within one inflatable or bladder to blow outward and allow air into the other air bladder. When the pneumatic driver is connected to positive displacement pump, and the pump shaft of a positive displacement pump is worn, operation of the pneumatic driver is not adversely affected when there is radial and side movement of the positive displacement pump shaft. The construction and clearance fits in the pneumatic driver as described above provide enough clearance so that some radial and side movement of the shaft support member and shaft caused by worn bearings in a positive displacement pump will not adversely affect operation of the linear driver. Additionally, the first and second inflatable air bladders provide a self-contained driving force. This type of construction is an improvement over other prior art pneumatic drivers having a piston and means for injecting air into either side of the piston where resulting bearing and seal leaks allow discharge of air onto the positive displacement pump shaft. The expansion heights of the bladders also provide a shaft stroke length of four inches which is sufficient for operating positive displacement pumps used for pumping a slurry of ammonium diuronate.

In the drawings and specifications there has been set forth the best mode presently contemplated for the practice of the present invention and although specific terms are employed, they are used in a descriptive sense only and not for purposes of limitation, the scope of the invention being defined in the claims.

We claim:

1. A pneumatic driver comprising
   a frame defining a longitudinal direction and having an air bladder frame member extending transverse to the longitudinal direction, the air bladder frame member having front and rear faces,
   a shaft support member mounted for slidable movement on said frame in a longitudinal direction defined by the frame, and a shaft mounted on the shaft support member and moveable between an extended driving position when the shaft support member is moved away from the air bladder frame member, and a retracted position,
   a first inflatable air bladder supported by said frame and connected to the front face of the air bladder frame member, and the shaft support member so that when said first air bladder is inflated said shaft is moved into an extended driving position,
   a second inflatable air bladder supported by said frame and connected to the rear face of the air bladder frame member, and including means operatively connecting said second air bladder to said shaft support member so that when said second air bladder is inflated, said shaft is moved to a retracted position, and
   valve manifold means supported by said air bladder frame member and operatively connecting said first and second air bladders for allowing air into and out of said air bladders for inflating the first air bladder while deflating the second air bladder and inflating the second air bladder while deflating the first air bladder, and
   wherein at least one support rod is mounted on the air bladder frame member, and including means operatively connecting the support rod to the shaft support member for allowing sliding movement of the shaft support member on the support rod and relative to the air bladder frame member.

2. A pneumatic driver according to claim 1 wherein said air bladders are formed of rubber.

3. A pneumatic driver according to claim 1 wherein said first and second air bladders are mounted in spaced relation to each other.

4. A pneumatic driver according to claim 1 wherein said frame comprises at least two, substantially parallel and longitudinally extending guiderods and front and rear spaced transversely extending frame members fixed to said guiderods, said front frame member having a shaft receiving orifice extending therethrough, and wherein said shaft extends forwardly through said shaft receiving orifice.

5. A pneumatic driver according to claim 4 wherein said shaft receiving orifice is dimensioned larger than said shaft by at least about 0.005 inches to provide a clearance fit and allow movement of said shaft within said shaft receiving orifice.

6. A pneumatic driver according to claim 4 wherein said valve manifold means is mounted integral on said rear frame member.

7. A pneumatic driver according to claim 4 wherein said shaft support member is positioned between said front and rear frame members and slidably mounted on said guiderods, and wherein said shaft is mounted on said shaft support member and extends forwardly through said shaft receiving orifice.

8. A pneumatic driver according to claim 7 wherein said first inflatable air bladder is positioned between said rear frame member and said shaft support member, and including means mounting said first air bladder to said shaft support member.

9. A pneumatic driver comprising a frame having two substantially parallel and longitudinally extending guiderods, front and rear transverse frame members fixed to said guiderods, said front frame member having a shaft receiving orifice extending therethrough, a shaft support member slidably mounted on said guiderods between the front and rear frame members, a shaft mounted on said shaft support member and extending forwardly through said shaft receiving orifice and being movable between an extended driving position and a retracted position, two spaced support rods mounted on said shaft support member and slidably mounted on said rear frame member, a rear support member and means mounting said rear support member to the ends of said support rods, a first inflatable air bladder mounted between said rear frame plate and said shaft support member and engaging said shaft support member for moving said shaft support member and shaft to an extended position when said first air bladder is inflated, a second inflatable air bladder mounted between said rear frame member and said rear support member and engaging said rear support member for moving said rear support member, support rods and shaft rearward when said second air bladder is inflated, and valve manifold means operatively connecting said first and second air bladders for allowing air into and out of said air bladders and for inflating said first air bladder while deflating the second air bladder and inflating the second air bladder while deflating the first air bladder.

10. A pneumatic driver according to claim 9 wherein said shaft receiving orifice is dimensioned larger than said shaft by at least 0.005 inches to provide a clearance fit between said shaft and orifice and allow movement of said shaft within said shaft receiving orifice.

11. A pneumatic driver according to claim 9 wherein said means mounting said support rod and said shaft support member includes a pair of openings in said shaft support member, and a bolt extending through each opening into said support rod, and wherein said bolts and openings are dimensioned to obtain clearance between each bolt and the shaft support member opening for allowing movement of said shaft support member relative to the bolt.

12. A pneumatic driver according to claim 11 wherein said clearance between said openings and said bolts are at least about 0.005 inches.

* * * * *